(12) United States Patent
Grimm

(10) Patent No.: US 10,902,187 B2
(45) Date of Patent: *Jan. 26, 2021

(54) AUTOMATED PROCESSING OF TRANSCRIPTS, TRANSCRIPT DESIGNATIONS, AND/OR VIDEO CLIP LOAD FILES

(71) Applicant: Designation Station LLC, Oakland, CA (US)

(72) Inventor: Christopher John Grimm, San Francisco, CA (US)

(73) Assignee: Designation Station, LLC, Oakland, CA (US)

(*) Notice: Subject to any disclaimer, the term of this patent is extended or adjusted under 35 U.S.C. 154(b) by 11 days.

This patent is subject to a terminal disclaimer.

(21) Appl. No.: 15/272,156

(22) Filed: Sep. 21, 2016

(65) Prior Publication Data

US 2017/0011020 A1   Jan. 12, 2017

Related U.S. Application Data

(63) Continuation of application No. 14/321,161, filed on Jul. 1, 2014, now Pat. No. 9,454,518.

(51) Int. Cl.
*G06F 40/16* (2020.01)
*G06F 40/232* (2020.01)
(Continued)

(52) U.S. Cl.
CPC .......... *G06F 40/166* (2020.01); *G06F 40/117* (2020.01); *G06F 40/197* (2020.01);
(Continued)

(58) Field of Classification Search
None
See application file for complete search history.

(56) References Cited

U.S. PATENT DOCUMENTS 6,869,018 B2   3/2005   Fifield et al.
8,788,523 B2   7/2014   Martin et al.
(Continued)

*Primary Examiner* — Richa Mishra
(74) *Attorney, Agent, or Firm* — Norton Rose Fulbright US LLP

(57) ABSTRACT

In an aspect, a computerized method for generating processed files of deposition testimony transcript designations may include accessing a file containing designations of contents of a textual transcript, quarantining errors in the designations, and generating a processed file containing processed designations of contents of the textual transcript having quarantined errors removed therefrom. In another aspect, a computerized method of generating designations for a deposition testimony transcript may include accessing designation information regarding designations made with respect to text of the deposition testimony transcript, accessing rules for generating designations based on the designation information, and generating the designations based on the rules. In a further aspect, a computerized method of updating designations for a deposition testimony transcript may include accessing an edited video clip list, accessing the designations for the deposition testimony transcript, comparing the edited video clip list to the designations, and updating the designations based on determined differences.

16 Claims, 11 Drawing Sheets

(51) Int. Cl.
*G06F 40/205* (2020.01)
*G06F 40/197* (2020.01)
*G06F 40/117* (2020.01)
*G06Q 50/18* (2012.01)
*G06F 40/166* (2020.01)

(52) U.S. Cl.
CPC .......... *G06F 40/205* (2020.01); *G06F 40/232* (2020.01); *G06Q 50/18* (2013.01)

(56) References Cited

U.S. PATENT DOCUMENTS

| | | |
|---|---|---|
| 9,015,098 B1 | 4/2015 | Crosley |
| 10,013,407 B2 | 7/2018 | Grimm |
| 2003/0122860 A1* | 7/2003 | Ino .................. G11B 27/105 715/716 |
| 2010/0092088 A1 | 4/2010 | Roman |
| 2011/0320198 A1 | 12/2011 | Threewitts et al. |
| 2013/0334300 A1* | 12/2013 | Evans ............. H04N 21/41407 235/375 |
| 2014/0289617 A1 | 9/2014 | Rajagopalan |
| 2015/0010235 A1* | 1/2015 | Copsey ............... G06F 16/3344 382/182 |

* cited by examiner

FIG. 1

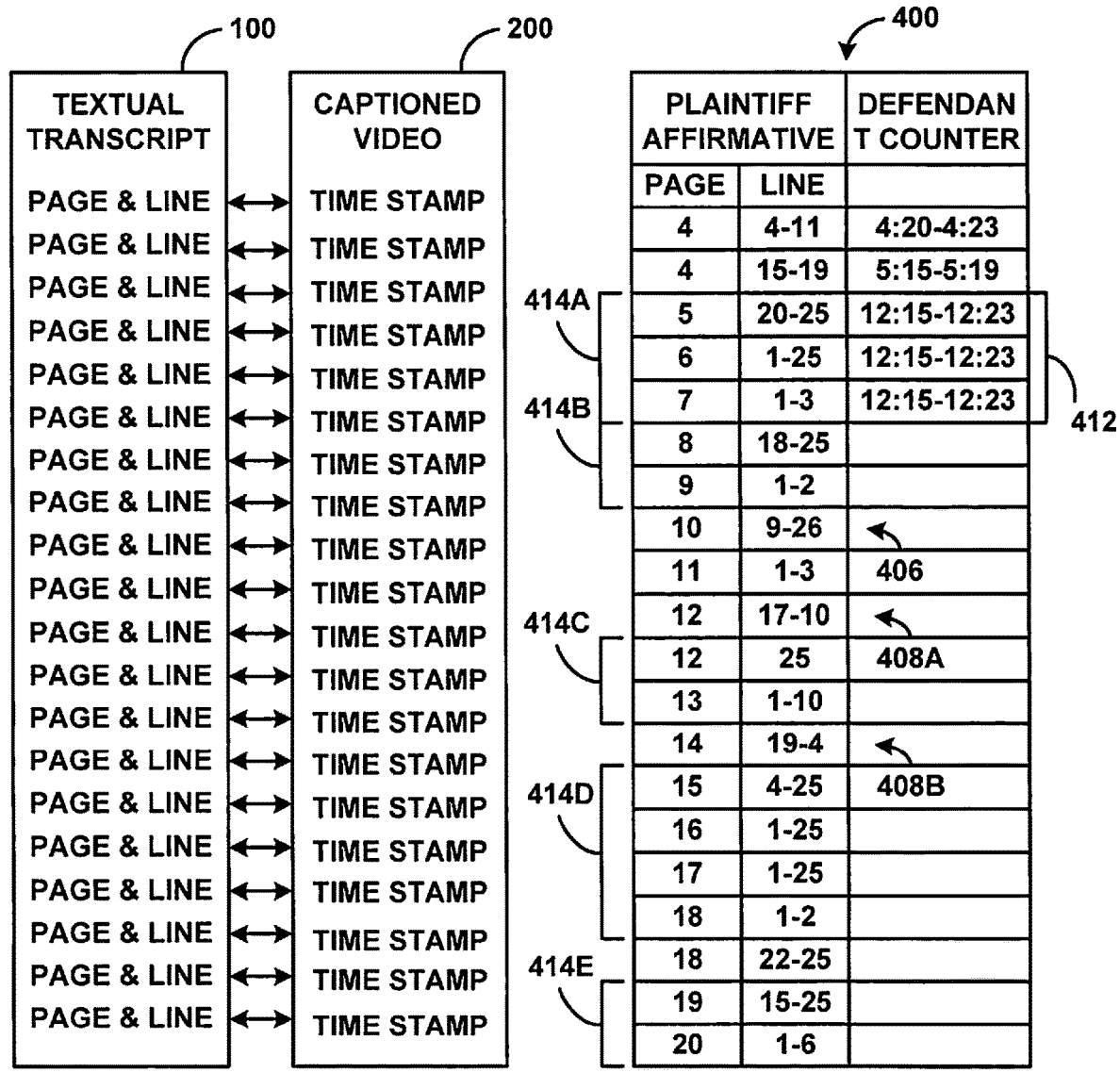

Page 4

1 Notary Public, was examined and testified as follows:

2             EXAMINATION

3 By Mr. Bond:

4     Q. Stacy, would you state your name for the 5 record.

6     A. Stacy King.

7     Q. You're an attorney; is that right?

8     A. Yes, I am.

9     Q. How long have you been in private 10 practice?

11     A. Approximately 15 years.

12     Q. Has the bulk of that practice been in the 13 context of commercial litigation?

14     A. Probably the bulk of it, yeah.

15     Q. Prior to representing GFC in the Cave-Corp 16 case, have you been involved in representing lenders in a 17 lawsuits against debtors and other people involved in a 18 lending transaction?

19     A. Yes.

20     Q. On many occasions?

21     A. Depends on how you define "many."

22     Q. How many occasions?

23     A. I don't really know.

24     Q. More than five?

25     A. Certainly.

FIG. 9

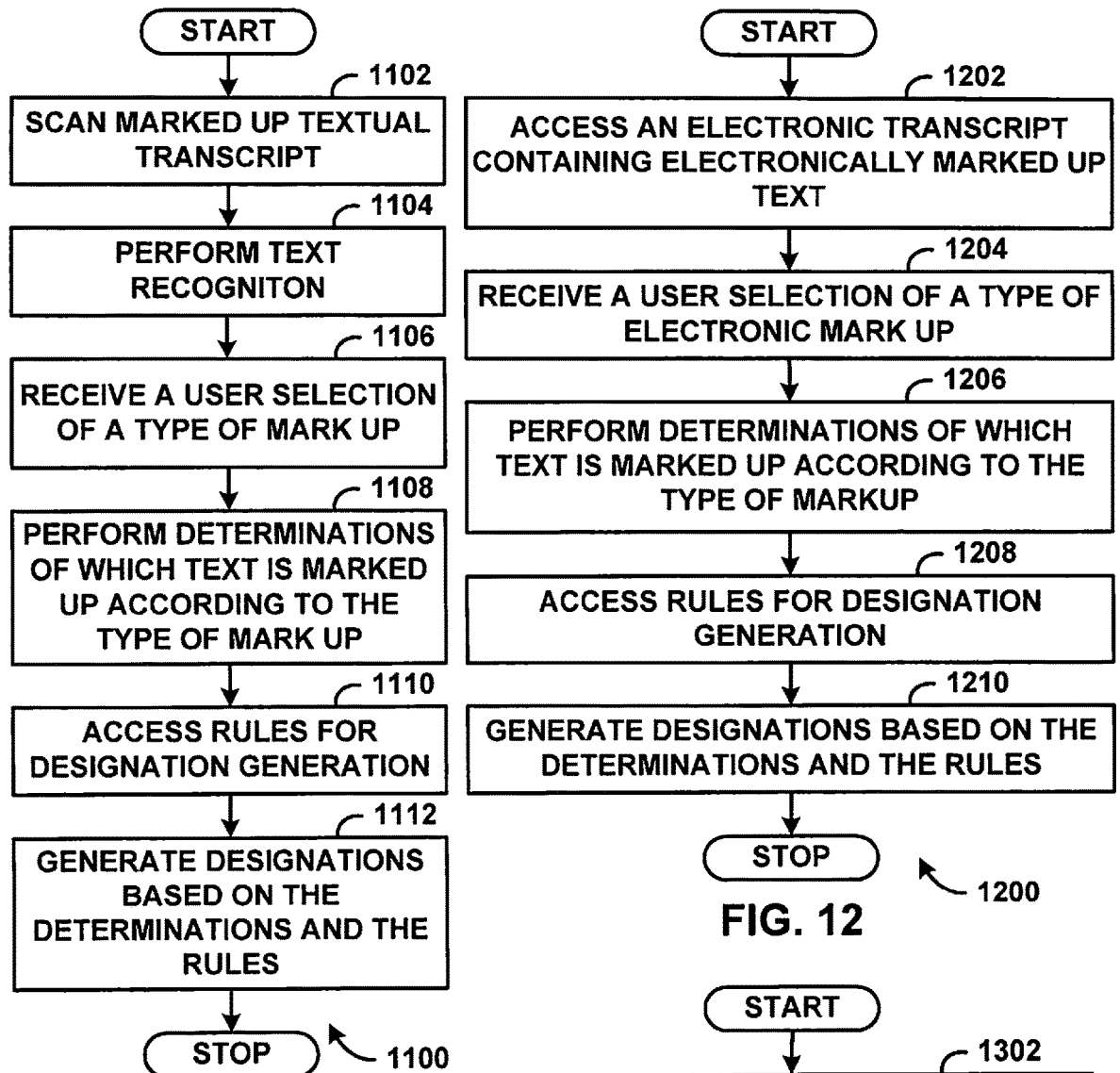
FIG. 11
FIG. 12
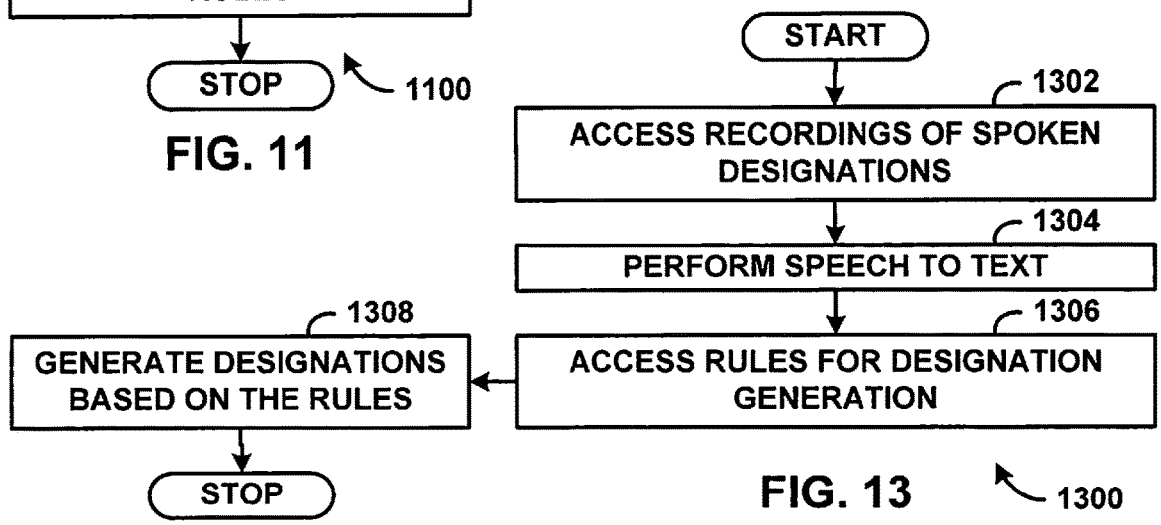
FIG. 13

AUTOMATED PROCESSING OF TRANSCRIPTS, TRANSCRIPT DESIGNATIONS, AND/OR VIDEO CLIP LOAD FILES

CROSS-REFERENCE TO RELATED APPLICATION

The present application is a continuation of U.S. patent application Ser. No. 14/321,161, filed Jul. 1, 2014 and entitled "AUTOMATED PROCESSING OF TRANSCRIPTS, TRANSCRIPT DESIGNATIONS, AND/OR VIDEO CLIP LOAD FILES," and is also related to commonly assigned, co-pending U.S. patent application Ser. No. 14/832,853, filed Aug. 21, 2015 and entitled "AUTOMATED PROCESSING OF TRANSCRIPTS, TRANSCRIPT DESIGNATIONS, AND/OR VIDEO CLIP LOAD FILES," the disclosures of which are incorporated herein in their entirety.

TECHNICAL FIELD

The present application relates to automated processing of transcripts, transcript designations, and/or video clips.

BACKGROUND

Today's legal trials frequently make use of deposition transcripts and closed captioned videos as exhibits that may be used to refresh the recollection of witnesses, impeach witnesses, or in lieu of testimony. Trial judges may require opposing parties to provide affirmative and counter designations in a deposition transcript, set limits on the runtime of video exhibits, and prohibit duplicate exhibits. The requirements set by judges can be imposed late in the trial preparation process or even during trial, leading to an urgent revision process at a difficult time.

Currently, making designations which correspond to deposition testimony of a deposition transcript is primarily a manual process. For example, trial attorneys manually select deposition testimony by highlighting portions of a deposition transcript. At this stage, errors may arise due to multiple trial attorneys designating the same portions of testimony. Then, paralegals manually convert these highlighted portions of the deposition transcript into a table or list of designations indicating the page and line numbers at which the designations begin and end. At this stage, more errors may arise due to typographical errors or due to multiple paralegals using different formats for the designations. Next, a trial technician manually feeds the designations into a video generation program. At this stage, the trial technician may spend significant time identifying and correcting errors, but other errors may also be generated, such as more typographical errors. The transcript/video generation program may then perform limited error checking to ensure that the manual designations are valid before generating a video from the designations. If any errors are found, the transcript/video generation program may identify which designations were found to be invalid. However, current systems are not always accurate with error reporting and it sometimes becomes difficult to pinpoint or ascertain errors that are present in designations. When presented with errors, a trial technician must then manually correct or remove these invalid designations before a processed transcript and/or video can be generated. Such correction may require further inquiries to the designating attorneys/paralegals, which stalls the process of generating the designated testimony documentation or video content. If significant overlapping of designations is present, then the runtime of the video may be a poor estimate of the actual runtime that may be ultimately achieved by removal of overlap. Accordingly, these delays can create further logistical problems because a trial tech is not able to determine run times for the designated content and whether a need to reduce designation scope is present.

Current video transcript systems are further hindered by existing methods of making designations. For example, portions of the video generated by the video generation program may be adjacent to other video portions in time. For example, if one designation corresponds to a part of the deposition transcript that ends at the end of a page, and if another designation corresponds to another part of the deposition transcript that begins at the beginning of the next page, current video generation programs are unable to combine the designations to generate a smooth video transition. In this case, the trial technician must manually delete one of the video portions and extend the other video to obtain the desired video. This manual editing process is time consuming and prone to errors that can lead to loss of data.

BRIEF SUMMARY

In an aspect, a method for generating processed files of deposition testimony transcript designations includes accessing, by one or more computer processors, a file containing designations of contents of a textual transcript. The method additionally includes quarantining, by the one or more computer processors, errors in the designations contained in the file. The method also includes generating, by the one or more computer processors, a processed file containing processed designations of contents of the textual transcript having quarantined errors removed therefrom.

In an aspect, a method of generating designations for a deposition testimony transcript includes accessing, by one or more computer processors, designation information regarding designations made with respect to text of the deposition testimony transcript. The method additionally includes accessing, by one or more computer processors, rules for generating designations based on the designation information. The method also includes generating, by the one or more computer processors, the designations based on the rules.

In an aspect, a method of updating designations for a deposition testimony transcript includes accessing, by one or more computer processors, an edited video clip list. The method additionally includes accessing, by the one or more computer processors, the designations for the deposition testimony transcript. The method also includes comparing, by the one or more computer processors, the edited video clip list to the designations to determine differences. The method further includes updating, by the one or more computer processors, the designations based on the determined differences.

In an aspect, a computer program product includes a non-transitory computer-readable medium having instructions recorded thereon that, when executed by one or more computer processors, cause the one or more computer processors to access a file containing designations of contents of a textual transcript. The instructions additionally cause the one or more computers to quarantine errors in the designations contained in the file. The instructions also cause the one or more computers to generate a processed file containing processed designations of contents of the textual transcript having quarantined errors removed therefrom.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which:

Figure 1:
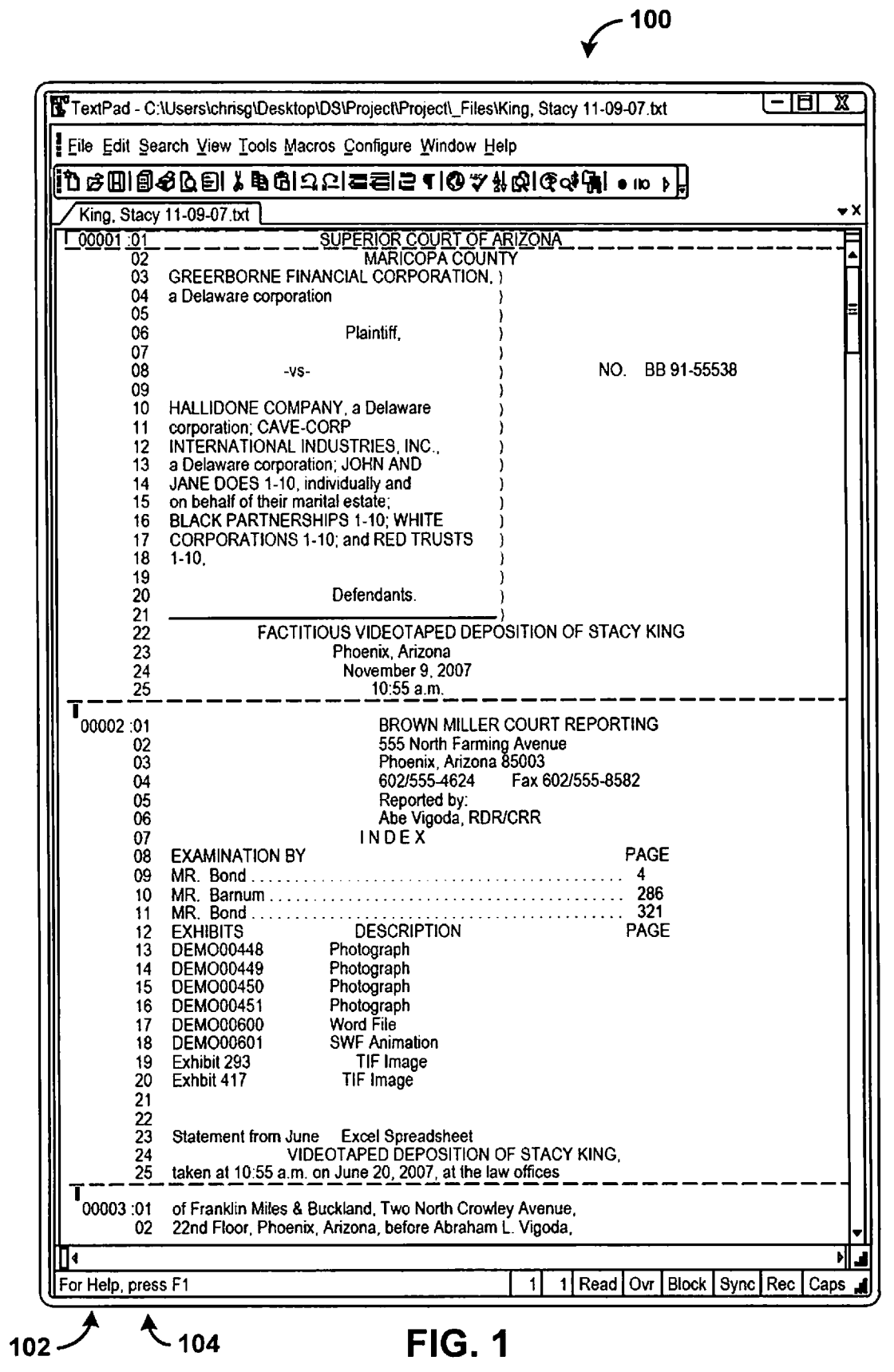

FIG. 1 illustrates a textual transcript of deposition testimony in accordance with the present disclosure;

FIG. 3 illustrates the textual transcript of FIG. 1 synchronized with the video of FIG. 2 in accordance with the present disclosure;

FIG. 4 illustrates a file containing two sets of designations of contents of the textual transcript of FIG. 1 in accordance with the present disclosure;

FIG. 9 illustrates a computer-processed and marked up textual transcript in accordance with the present disclosure;

FIG. 11 illustrates a computer-implemented method for generating designations from a scan of a marked up textual transcript in accordance with the present disclosure;

FIG. 12 illustrates a computer-implemented method for generating designations from an electronic transcript containing electronically marked up text in accordance with the present disclosure;

FIG. 13 illustrates a computer-implemented method for generating designations from recordings of spoken designations in accordance with the present disclosure;

DETAILED DESCRIPTION

Figure 2:
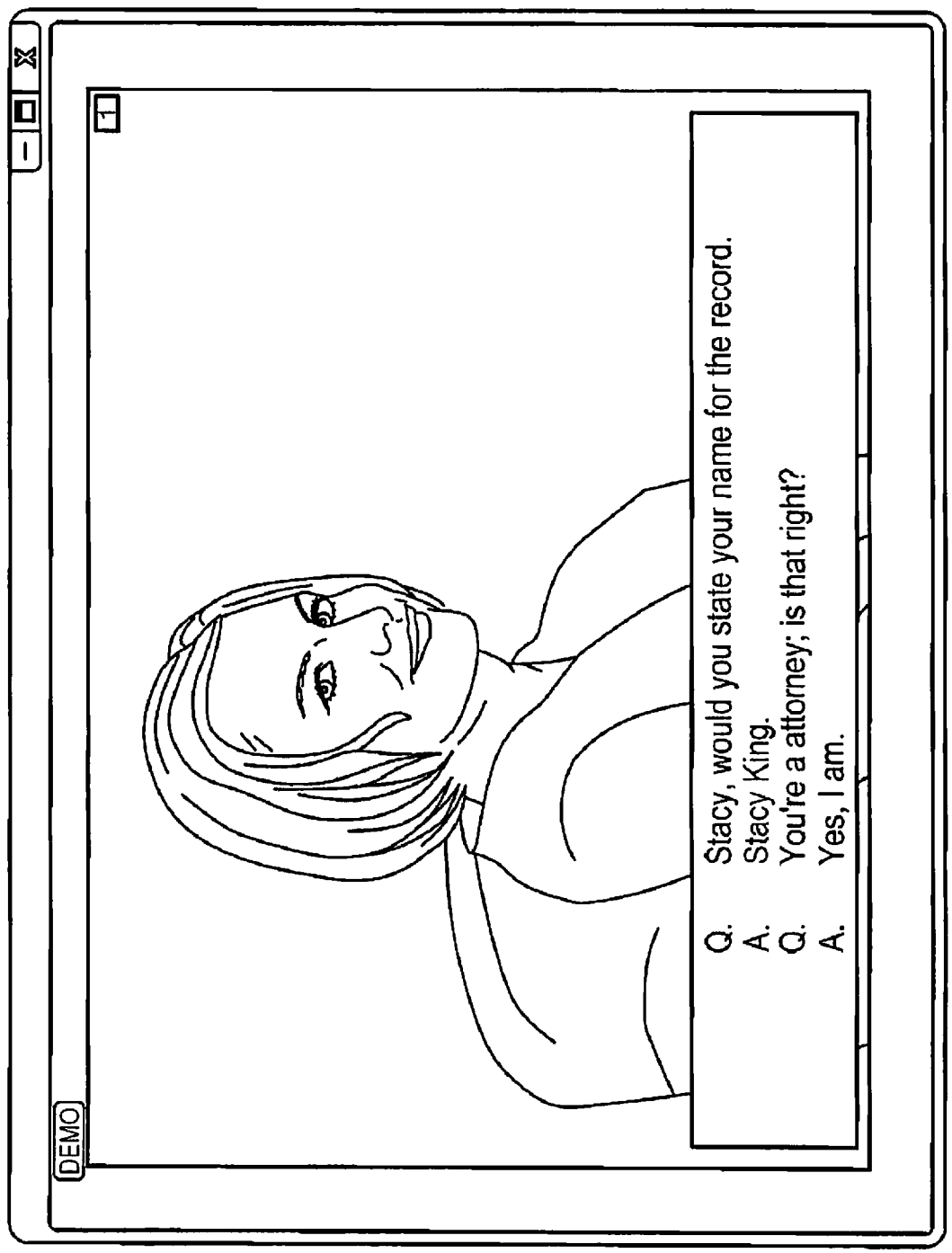
FIG. 2 illustrates a video of the deposition testimony of FIG. 1 in accordance with the present disclosure.

The present disclosure provides a computer-implemented process that automates many of the tasks normally performed by a trial technician. In some aspects, the computer-implemented process automates generation of processed files of deposition testimony transcript designations. In additional aspects, the computer-implemented process automates generation of a processed and marked up textual transcript. In other aspects, the computer-implemented process automates generation of deposition testimony transcript designations. In further aspects, the computer-implemented process automates processing of video clips having time codes. In still further aspects, the computer-implemented process automates comparison of designations and/or update of designations.

Advantageously, the computer-implemented process disclosed herein may quarantine errors in a file of deposition testimony transcript designations. An accompanying quarantine report allows attorneys to quickly resolve any errors that are encountered early in the process. The quarantine function may also allow use of the error free designations without first resolving all errors. For example, the error free designations may be employed to generate the processed video without first correcting all errors in the designations. This capability advantageously permits runtime and other properties of the processed video to be assessed earlier than would otherwise be possible. By assessing runtime of the processed video earlier in the process, determination may be made whether attorneys have over designated contents of the deposition testimony transcript, and begin making adjustments accordingly. Additionally, the error free designations may be used to generate the processed and marked up textual transcript without first correcting all errors in the designations. This capability advantageously provides a marked up hard or soft copy of the transcript that the attorneys may refer to during an editing process in which the invalid designations are clarified and/or the aforementioned over designation problem is addressed.

In additional aspects, the computer-implemented process may automatically remove overlap of designations and/or combine adjacent designations by page, line number, and the like. A user interface may permit setting of line ranges for individual transcripts or designation sets, and these line ranges may be employed in the process of combining adjacent designations and removing overlap. It is also provided that batch processing may be utilized to automatically process designations, which can be used to generate processed videos and processed and marked-up textual transcripts for large numbers of depositions taken with respect to large numbers of witnesses involved in a trial. Advantageously, these capabilities may reduce the time required in editing exhibits by one or many orders of magnitude. These and other capabilities of the computer-implemented process are described in greater detail below with respect to FIG. 1 to FIG. 16.

FIG. 1 illustrates a textual transcript 100 of deposition testimony. For example, the textual transcript 100 may have page numbers 102 and line numbers 104 as will be readily appreciated by one skilled in the art. The textual transcript 100 may be stored electronically in a non-transitory computer-readable medium and displayed or printed at need by a computer processor. As will be readily understood by one skilled in the art, attorneys representing parties in a trial may mark up printed versions of such transcripts by highlighting, underlining, or otherwise indicating text of the transcript to be designated as a plaintiff affirmative, a defense counter, a defense affirmative, and/or a plaintiff counter.

FIG. 2 illustrates a video 200 of the deposition testimony of FIG. 1. The video 200 may have captions corresponding to the text of the textual transcript 100 of FIG. 1. As shown in FIG. 3, the textual transcript 100 of FIG. 1 may be synchronized with the video 200 of FIG. 2, such that a designation of a page and line number may be used to designate either or both of corresponding content of the textual transcript and the video. One skilled in the art will readily recognize that a computer-implemented program may be used to automatically recognize audio of the video that corresponds to text of the transcript. Such a computer-implemented program may automatically synchronize text of the textual transcript 100 with time stamps of the video 200, and automatically generate closed captions for the video 200 based on the corresponding text of the textual transcript 100.

FIG. 4 illustrates a file 400 containing two sets of designations of contents for two manually marked up copies of the textual transcript 100 of FIG. 1. Such a file 400 may be generated, for example, by paralegals manually entering the designations in a spreadsheet, wherein rows correspond to data entries containing designations expressed as page and line numbers, and columns correspond to pre-defined categories of the designations. For example, one column may correspond to a plaintiff affirmative category 402 for designations made in one marked up copy of the transcript, and another column may correspond to a defendant counter category 404 for designations made in another marked up copy of the transcript. Additional columns may be employed for additional categories, such as a defendant affirmative category for designations made in yet another marked up copy of the transcript, and a plaintiff counter category for designations made in still another marked up copy of the transcript. Further, as shown, designations in these columns may be provided in a single format or multiple formats and processed accordingly.

It should be appreciated that the designations of file 400 may include errors or other undesirable characteristics. For example, a designation may be invalid because a page number is out of range as at invalid designation 406, because an ending line number is less than a starting line number as at invalid designation 408A and invalid designation 408B, or because a format of the designation cannot be recognized. Additionally, it may not be desirable for overlap of entries to be present as at 412. Also, a single designation spanning multiple pages may be preferred over adjacent designations, such as adjacent designations 414A-414E that end at the last line of one page and begin at the first line of an adjacent page, or adjacent designations that end at one line of a page, and begin at a next line of the same page. As described below with reference to FIG. 5, a computer-implemented process disclosed herein may quarantine errors, such as invalid designations 406, 408A, and 408B, to yield a processed file free of invalid designations and, if desired, also remove overlap and/or combine adjacent designations.

Figure 5:
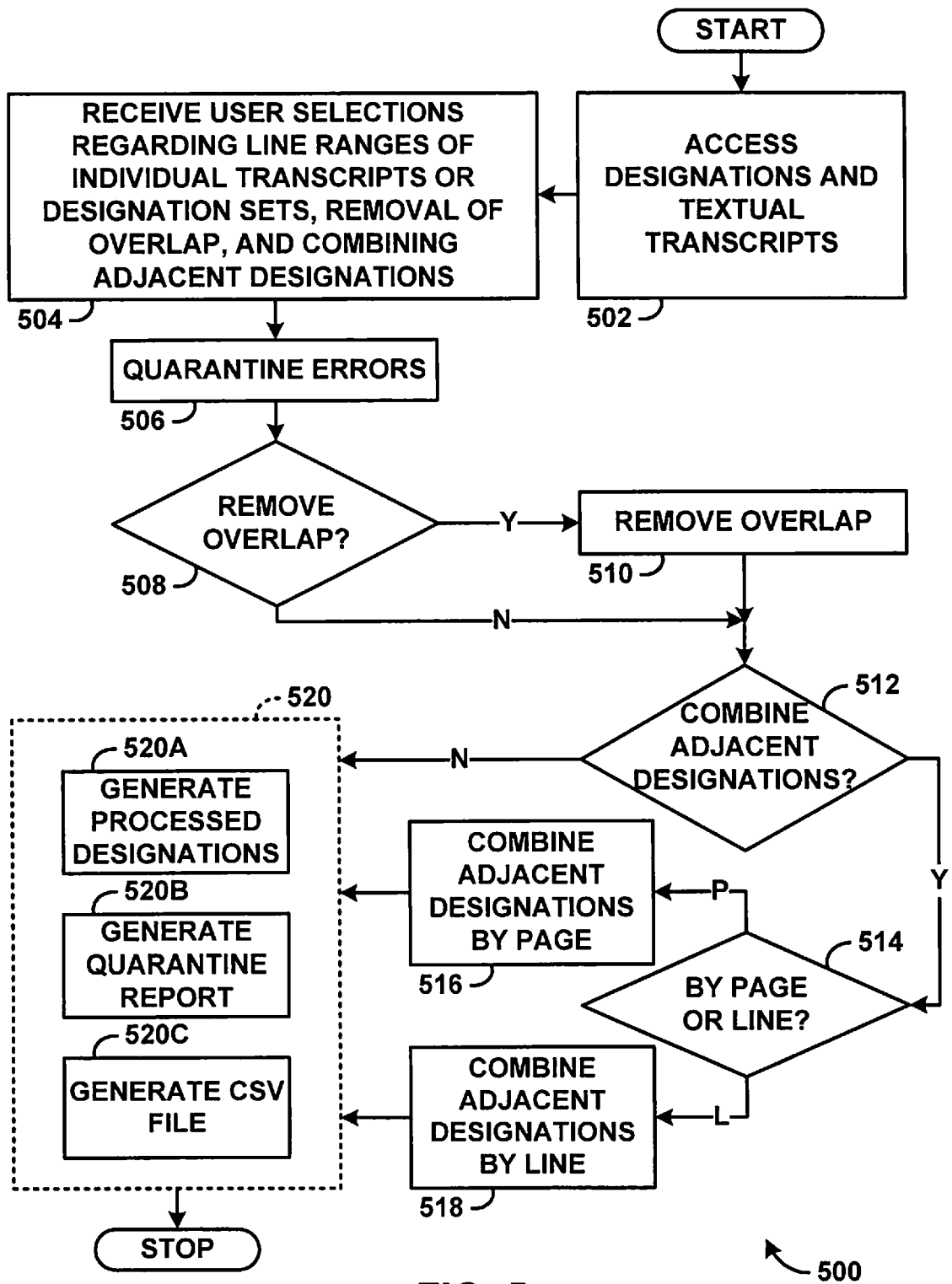
FIG. 5 illustrates a computer-implemented method for generating processed files of deposition testimony transcript designations in accordance with the present disclosure.

FIG. 5 illustrates a computer-implemented method 500 for generating processed files of deposition testimony transcript designations in accordance with the present disclosure. Beginning at block 502, one or more computer processors may access one or more electronic files containing designations and, optionally, a textual transcript. For example, the one or more computer processors may receive one or more of the one or more electronic files over an interface or communication link. Alternatively or additionally, the one or more computer processors may access one or more non-transitory computer-readable media storing one or more of the one or more files. It is envisioned that a user interface may receive a selection of an electronic folder form a user, and thereby access a folder containing the one of more electronic files. Alternatively or additionally, it is envisioned that the computer may access the electronic files based on a file naming methodology utilized to indicate that the files relate to one another. Accordingly, it is envisioned that a user may designate a folder containing multiple sets of designations and textual transcripts, and perform batch processing using the file naming methodology to determine which designations and textual transcripts relate to one another. Processing may proceed from block 502 to block 504.

At block 504, the one or more computer processors may receive user selections regarding removal of overlapping designations (e.g. from two designations having overlapping subject matter) and combining adjacent designations, as well as setting individual line ranges for a specific transcript or designation set on a specific date. For example, it is envisioned that the interface may inform the user of the number of lines per page in the textual transcript, and that the user may edit this information if desired. Alternatively or additionally, a command line user interface may ask the user to supply a number of lines per page. The user interface may further prompt the user to select whether to remove overlap, and then, after the user selects whether to remove overlap, ask the user whether to combine adjacent designations (or vice versa). In response to the user selecting to combine designations, the interface may ask the user whether to combine by page or by line, and a corresponding selection may be received. It is also envisioned that a graphical user interface may be employed instead of, or in addition to, a command line interface. Processing may proceed from block 504 to block 506.

At block 506, the one or more computer processors may quarantine errors in the designations. For example, the designations may be processed sequentially in order of foremost beginning page and line number to hindmost beginning page and line number to determine if they are invalid. As previously mentioned, a designation may be invalid because a page number is out of range, because an ending line number is less than a starting line number, or because a format of the designation cannot be recognized. Any designations determined to be invalid may be copied to the quarantine log file and removed from the designations. In some cases, both portions that overlap may be processed and not be recognized as errors in designations. Once all errors have been quarantined, processing may proceed from block 506 to block 508.

At block 508, a determination may be made whether the user selected to remove overlap. If it is determined, at block 508, that the user selected to remove overlap, then processing may proceed from block 508 to block 510. However, if it is determined, at block 508, that the user selected not to remove overlap, then processing may proceed to block 512.

At block 510, the one or more computer processors may remove overlap in the designations. For example, the two or more sets of designations may be joined together, and the designations may be sorted and formatted by page and line numbers so that everything is sequential. The designation having the first page and line may be designated as a previous designation and the next designation may be designated as a current designation. Additionally, if the current designation begins before the end of the previous designation, and if the current designation ends before the end of the previous designation, then the current designation may be removed. Also, if the current designation begins before the end of the previous designation, and if the current designation ends after the end of the previous designation, then the end of the previous designation may be replaced with the end of the current designation. The next designation may then be designated as the current designation, and the process may be repeated. If there is no overlap found between the previous and current designations, then the current designation may be designated as the previous designation, the next designation may be designated as the current designation, and the process may repeat. Processing may repeat in this manner until all designations are processed. It is envisioned that metadata may identify which designations are plaintiff affirmatives, defendant counters, defendant affirmatives, and plaintiff counters so that the designations may be sorted into separate files. Alternatively, plaintiff affirmatives may be processed separately form defendant counters, etc. In this case, the process may not include joining two or more sets of designations together. Once all overlap has been removed, processing may proceed from block 510 to block 512.

At block 512, the one or more computer processors may make a determination whether the user selected, at block 504, to combine adjacent designations. If it is determined, at block 512, that the user selected to combine designations, then processing may proceed from block 512 to block 514. However, if it is determined, at block 512, that the user did not select to combine designations, then processing may proceed from block 512 to block 520.

At block 514, the one or more computer processors may determine whether the user selected, at block 504, to combine adjacent designations by line number, either by continuing the designation to the next page or by combining any adjacent line numbers. If it is determined, at block 514, that the user selected to combine designations by page number, then processing may proceed from block 514 to block 516. However, if it determined, at block 514, that the user selected to combine by line number, then processing may proceed form block 514 to block 518.

At block 516, the one or more computer processors may, by using the line ranges set per transcript or designation set, combine adjacent designations that end at the last line of one page and begin at the first line of a next page. For example, the designations may be processed sequentially in order of foremost beginning page and line number to hindmost beginning page and line number. During the processing of a current designation and a next designation, a determination may be made whether the current designation ends on the last line of one page and the next designation begins on a first line of a next page. If it is determined that the current designation ends on the last line of one page and the next designation begins on a first line of a next page, then a new designation may be created that begins on the same page and line number as the current designation, and that ends on the same page and line number as the next designation. Then, the current and next designations may be removed from the designations, without being added to the quarantine log file, and the new designation may be added to the designations and set as the current designation for further processing. However, if it is determined that the current designation does not end on the last line of one page or that the next designation does not begin on the first line of the next page, then the next designation may be set as the current designation for further processing. In some implementations, it is envisioned that counter designations adjacent to affirmative designations may not be combined. Thus, the combination of adjacent designations may be based on designation type. Once all designations have been processed, then processing may proceed from block 516 to block 520.

At block 518, the one or more computer processors may, by using the line ranges set per transcript or designation set, combine adjacent designations that end at one line of a page, and begin at a next line of the same page, or that end at the last line of one page and begin at the first line of a next page. For example, the designations may be processed sequentially in order of foremost beginning page and line number to hindmost beginning page and line number. During the processing of a current designation and a next designation, a determination may be made whether the current designation ends at one line of a page and the next designation begins at a next line, of the same page, or if the current designation ends on the last line of one page and the next designation begins on a first line of a next page. If it is determined that the current designation ends at one line of a page and the next designation begins at a next line of the same page, or that the current designation ends on the last line of one page and the next designation begins on a first line of a next page, then a new designation may be created that begins on the same page and line number as the current designation, and that ends on the same page and line number as the next designation. Then, the current and next designations may be removed from the designations, without being added to the quarantine log file, and the new designation may be added to the designations and set as the current designation for further processing. However, if it is determined that the current designation ends at one line of a page and the next designation does not begin at a next line of the same page, and that the current designation does not end on the last line of one page or that the next designation does not begin on the first line of the next page, then the next designation may be set as the current designation for further processing. In some implementations, it is envisioned that counter designations adjacent to affirmative designations may not be combined. Once all designations have been processed, then processing may proceed from block 518 to block 520.

At block 520, the one or more computer processors may generate processed designations at block 520A, generate a quarantine report at block 520B, and generate a comma separated values (CSV) file at block 520C. For example, if the user selected, at block 504, to remove overlap and/or combine adjacent designations, then the designations returned at block 520A may also have overlap removed and adjacent designations combined, as previously described. Also, the quarantine log file may be returned as the quarantine report. Further, the separate text files containing the different types of processed designations may be joined together into a CSV file at block 520C.

Figure 6:
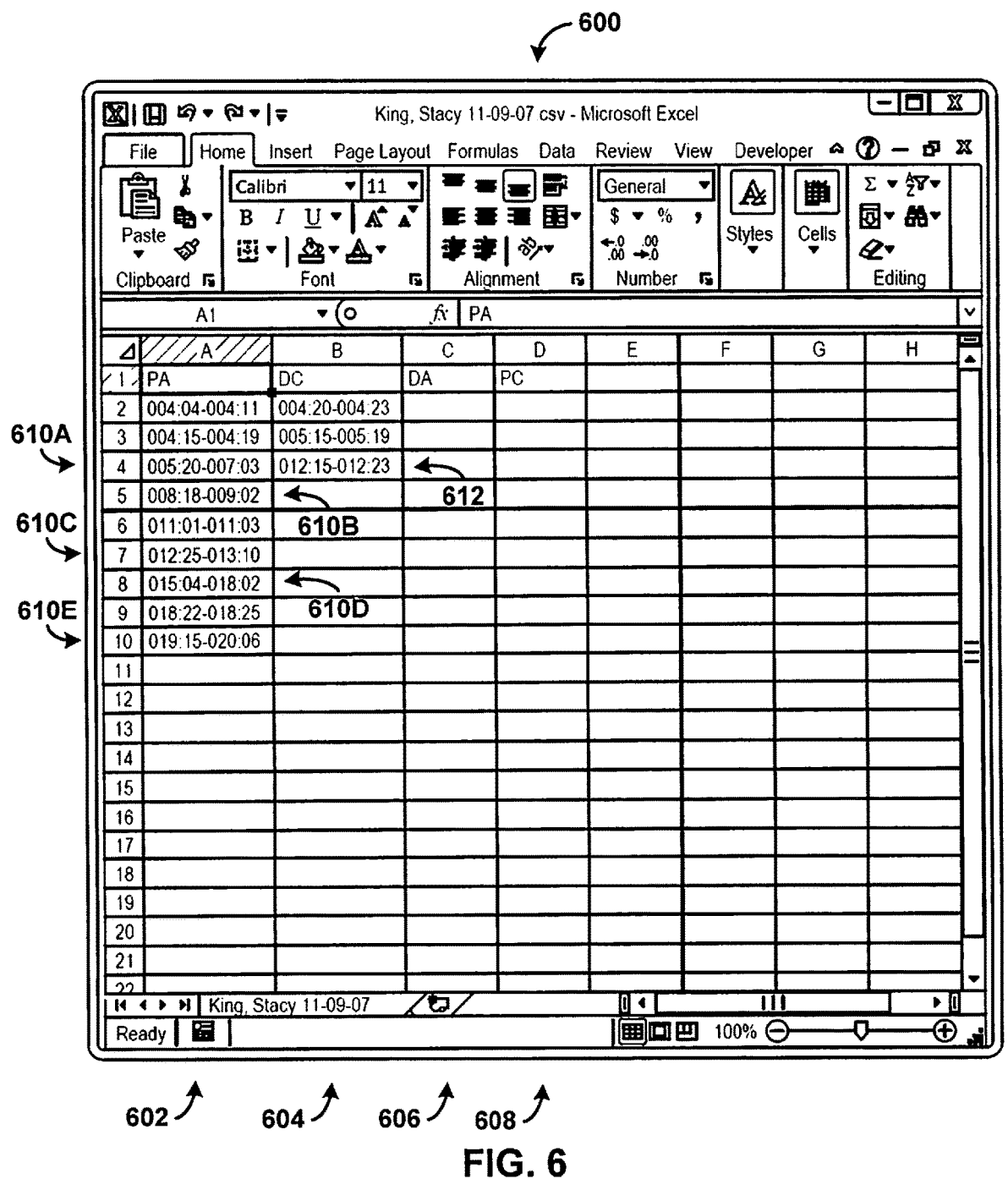
FIG. 6 illustrates a computer-processed file containing two sets of processed designations of contents of the textual transcript having quarantined errors removed therefrom in accordance with the present disclosure.

FIG. 6 illustrates a CSV file 600 containing two sets of processed designations of contents of the textual transcript having quarantined errors removed therefrom in accordance with the present disclosure. The CSV file 600 may be displayable as a spreadsheet having columns for plaintiff affirmatives 602, defendant counters 604, defendant affirmatives, 606, and plaintiff counters 608, as well as custom fields. The CSV file 600 may be automatically stored in a non-transitory computer-readable medium and automatically assigned a name according to a naming convention that indicates the textual transcript to which it relates. Alternatively or additionally, a memory location, such as a folder, may be automatically selected to indicate the textual transcript to which it relates. In addition to being free of errors, the processed designations may include new designations 610A-610E that were created to replace adjacent designations, and a new designation 612 created to replace overlapping designations, as described above.

Figure 7:
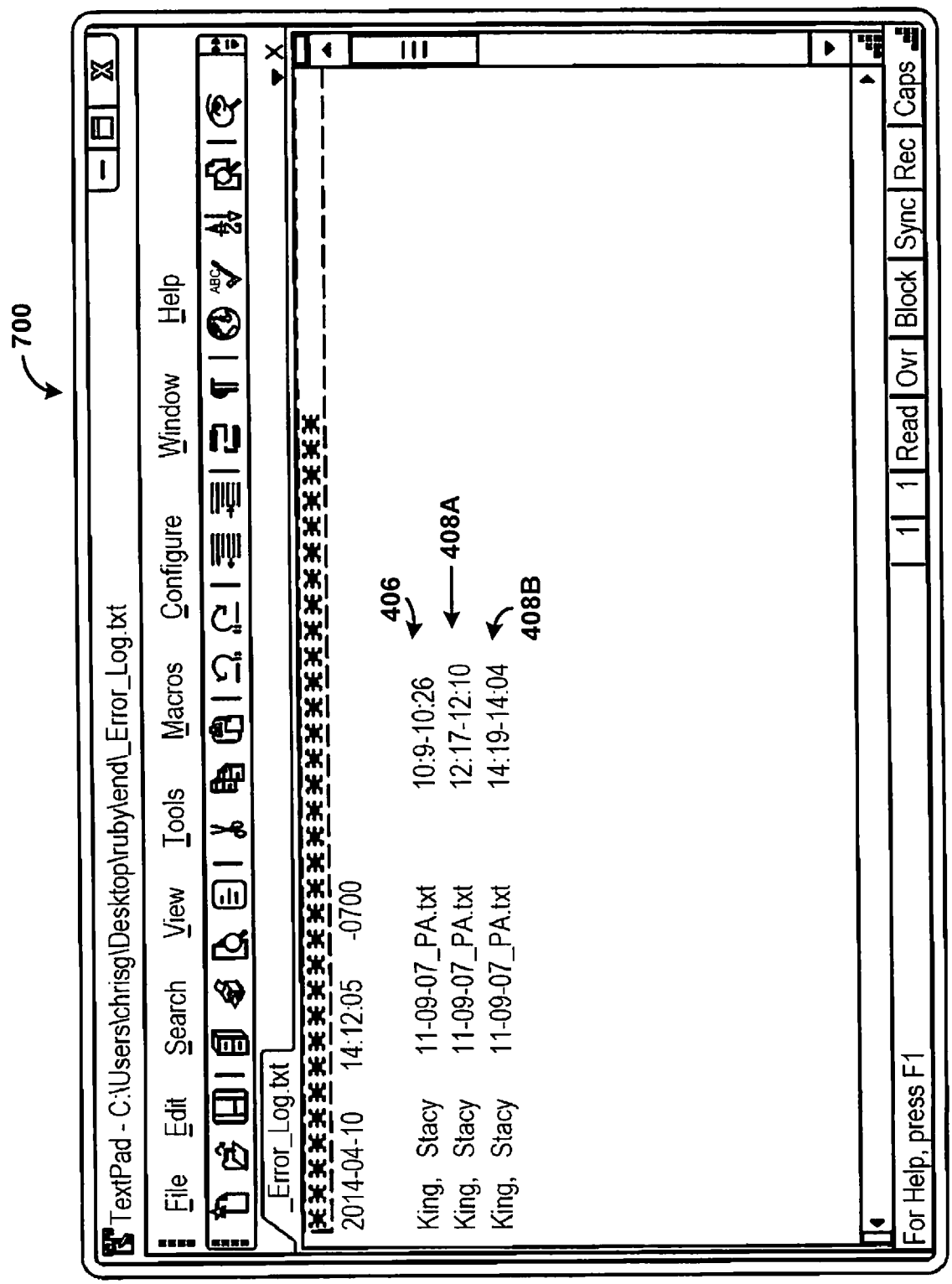
FIG. 7 illustrates a computer-generated quarantine report identifying the quarantined errors in accordance with the present disclosure.

FIG. 7 illustrates a quarantine report 700 identifying the quarantined errors in accordance with the present disclosure. For example, invalid designations 406, 408A, and 408B may be included in the quarantine report. The quarantine report 700 may be automatically stored in a non-transitory computer-readable medium and automatically assigned a name according to a naming convention that indicates the textual transcript to which it relates. Alternatively or additionally, a memory location, such as a folder, may be automatically selected to indicate the textual transcript to which it relates. It is envisioned that the quarantine report 700 may be displayed, printed, or otherwise rendered in accordance with user selections.

Figure 8:
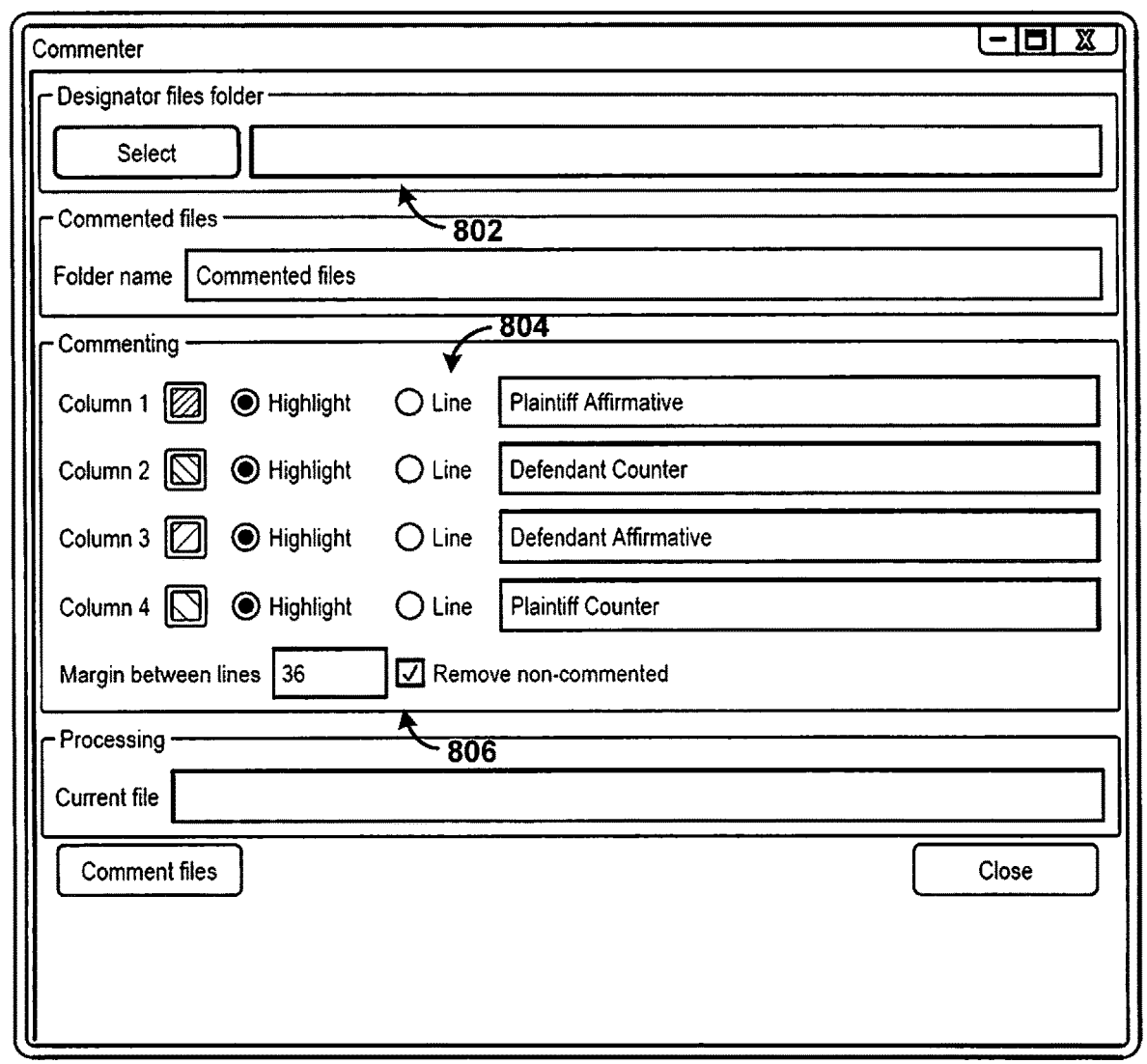
FIG. 8 illustrates a computer-implemented graphical user interface adapted to receive user selections for generating a processed and marked up textual transcript in accordance with the present disclosure.

FIG. 8 illustrates a graphical user interface 800 adapted to receive user selections for generating a processed textual transcript in accordance with the present disclosure. For example, a folder selection control 802 may be provided whereby a user may select a folder, stored on a non-transitory computer-readable medium, of files to be processed. Also, a set of markup controls 804 may be provided that permit a user to select a hue of highlight or line for use in marking, by the one or more computer processors, contents of the textual transcript corresponding to two or more pre-defined categories, such as a plaintiff affirmative category, a defense counter category, a defense affirmative category, a plaintiff counter category, and/or custom user categories. It is envisioned that text boxes may be provided for the user to specify the categories to be used with each hue, and that radio buttons may be provided to allow the user to select a highlight type of markup or a line type of markup for each category. Additional controls 806, such as a checkbox and drop down menu, may be provided to allow the user to select to remove non-designated text, and to select a margin to be employed between lines.

FIG. 9 illustrates a processed textual transcript 900 in accordance with the present disclosure. The one or more computers may access the selected folder and determine, according to a naming convention, which processed designations relate to which textual transcripts within the folder. It is envisioned that batch processing of multiple transcripts may be carried out in this fashion. The one or more computers may create a processed textual transcript according to the user selections by, for example, marking up text of the first category, as at 902A and 902B, so as to be distinguishable from text of the second category, as at 904. Additional details regarding generating a processed textual transcript are provided below with reference to FIG. 10.

Figure 10:
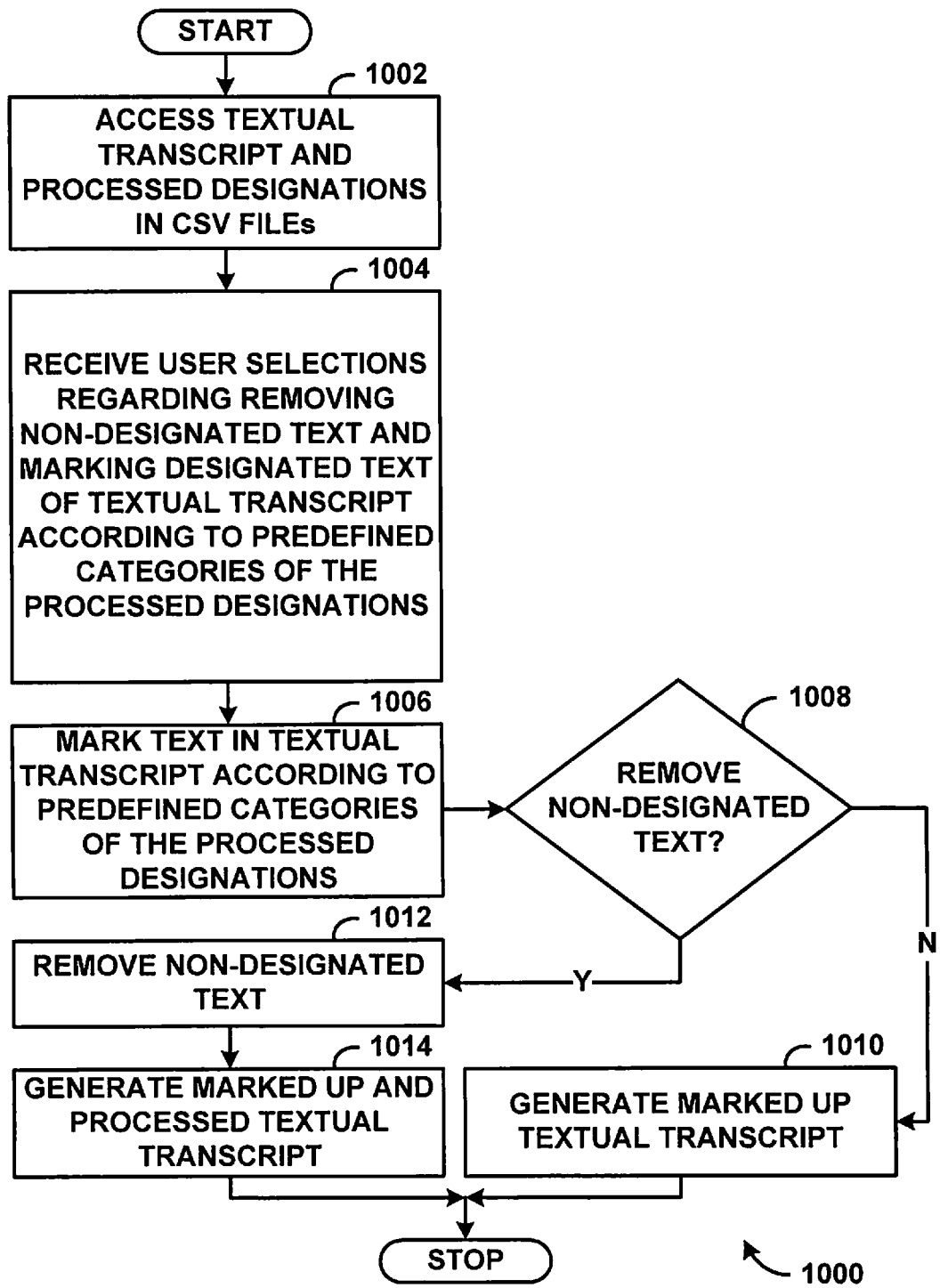
FIG. 10 illustrates a computer-implemented method for generating a processed and marked-up textual transcript in accordance with the present disclosure.

FIG. 10 illustrates a computer-implemented method 1000 for generating a processed and marked up textual transcript in accordance with the present disclosure. Beginning at block 1002, one or more computer processors may access one or more electronic files containing the processed designations, such as a CSV file, and a corresponding textual transcript. For example, the one or more computer processors may receive one or more of the one or more electronic files over an interface or communication link. Alternatively or additionally, the one or more computer processors may access one or more non-transitory computer-readable media storing one or more of the one or more files. It is envisioned that a user interface may receive a selection of an electronic folder from a user, as described above, and thereby access a folder containing the one or more electronic files. Alternatively or additionally, it is envisioned that the computer may access the electronic files based on a file naming methodology utilized to indicate that the files relate to one another. Accordingly, it is envisioned that a user may designate a folder containing multiple sets of processed designations and textual transcripts, and perform batch processing using the file naming methodology to determine which processed designations and textual transcripts relate to one another. Processing may proceed from block 1002 to block 1004.

At block 1004, the one or more computer processors may receive user selections regarding removing non-designated text and marking designated text of a textual transcript according to predefined categories of processed designations. For example, the user interface of FIG. 8 may provide the controls described above, and the selections may be received by the controls. It is also envisioned that a command line user interface may be employed instead of, or in addition to, a graphical user interface. Processing may proceed from block 1004 to block 1006.

At block 1006, the one or more computer processors may markup text of the textual transcript according to the user selections, as described above. For example, a hue of markup for a first category of text may be applied as a highlight, as an underline, as a text color, or as a line in a margin, as selected by the user. Additionally, a hue of markup for a second category of text may be applied as a highlight, as an underline, as a text color, or as a line in a margin, as selected by the user. Also, a hue of markup for a third category of text may be applied as a highlight, as an underline, as a text color, or as a line in a margin, as selected by the user. Further, a hue of markup for a fourth category of text may be applied as a highlight, as an underline, as a text color, or as a line in a margin, as selected by the user. It is envisioned that additional categories of text may be marked up. Once all of the categories of text that have been selected by the user to be marked up have been processed, processing may proceed from block 1006 to block 1008.

At block 1008, a determination may be made whether the user selected to remove non-designated text. If it is determined, at block 1008, that the user selected to remove non-designated text, then processing may proceed from block 1008 to block 1010. However, if it is determined, at block 1008, that the user selected not to remove non-designated text, then processing may proceed to block 1012.

At block 1010, the one or more computer processors may generate the marked up textual transcript. Generating the marked up textual transcript at block 1010 may include recording the marked up transcript in a computer-readable medium, and automatically assigning a name according to a naming convention that indicates the processed designations and/or, textual transcript to which it relates. Alternatively or additionally, a memory location, such as a folder, may be automatically selected to indicate the processed designations and/or textual transcript to which it relates. It is envisioned, for example, that the marked up textual transcript may be saved in a portable document format (PDF). Alternatively or additionally, generating the marked up textual transcript at block 1010 may include printing the marked up textual transcript, generating an electronic display of the marked up textual transcript, or otherwise rendering the marked up textual transcript.

At block 1012, the one or more computer processors may create a new textual transcript containing only marked-up text designated by the processed designations, and employ margins between lines as specified by the user. Alternatively, line margin options may allow the user to set a distance of line annotation from a side of the text, rather than a space between lines of text on a page. Once all designated text has been copied to the new textual transcript, the new textual transcript may be designated for further processing, and processing may proceed from block 1012 to block 1014.

At block 1014, the one or more computer processors may generate the marked up and processed textual transcript. Generating the marked up and processed textual transcript at block 1014 may include recording the new textual transcript in a computer-readable medium, and automatically assigning a name according to a naming convention that indicates the processed designations and/or, textual transcript to which it relates. Alternatively or additionally, a memory location, such as a folder, may be automatically selected to indicate the processed designations and/or textual transcript to which it relates. It is envisioned, for example, that the marked up and processed textual transcript may be saved in a portable document format (PDF). Alternatively or additionally, generating the marked up and processed textual transcript at block 1014 may include printing the marked up and processed textual transcript, generating an electronic display of the marked up and processed textual transcript, or otherwise rendering the marked up and processed textual transcript.

FIGS. 11-13 illustrate computer-implemented methods 1100, 1200, and 1300 in which one or more computer processors generating designations for a deposition testimony transcript. These processes carry out procedures that include accessing, by the one or more computer processors, designation information regarding designations made with respect to text of a deposition testimony transcript. These processes additionally carry out procedures that include accessing, by the one or more computer processors, rules for generating designations based on the designation information. These processes also carry out procedures that include generating, by the one or more computer processors, the designations based on the rules. These processes are individually described in further detail below with reference to FIGS. 11-13.

FIG. 11 illustrates a computer-implemented method 1100 for generating designations from a scan of a marked up textual transcript in accordance with the present disclosure. Beginning at block 1102, one or more computer processors may scan a marked up textual transcript into computer memory. For example, a PDF may be generated by scanning a textual transcript having highlighted, underlined, and/or otherwise marked up text. It is envisioned that the marked up textual transcript may have been manually marked up by an attorney. Alternatively, it is envisioned that the marked up textual transcript may have been generated by method 1000 (see FIG. 10) and printed. Processing may proceed from block 1102 to block 1104.

At block 1104, the one or more computer processors may perform text recognition of at least marked up text of the textual transcript. Processing may proceed from block 1104 to block 1106.

At block 1106, the one or more computer processors may receive, via a user interface, a user selection of a type of mark up, such as highlighted text, underlined text, or otherwise marked up text. For example, it is envisioned that the user may be able to specify a hue of highlight or color of underline to aid in detection of highlighted text. Processing may proceed from block 1106 to block 1108.

At block 1108, the one or more computer processors may perform determinations regarding which text of the textual transcript is marked up, and these determinations may be performed according to the type of markup selected by the user. For example, if the user selected highlighted text, then other types of markup may be ignored. Additionally, if the user specified a color of highlight, then the highlighted text may be identified by detecting the color of the region of the page of the PDF in which the text is located. Processing may proceed from block 1108 to block 1100.

At block 1110, the one or more computer processors access rules for designation generation. For example, the rules may specify a format for listing the designations, and this format may be uniform. Processing may proceed from block 1110 to block 1112.

At block 1112, the one or more computer processors may generate designations based on the determinations and the rules. For example, a text file may be created that lists the designations and this text file may be given a name according to a naming convention specified in the rules accessed at block 1110. It is also envisioned that a user input, received via the user interface, may provide a category for the designations, such as plaintiff affirmative, defense counter, defense affirmative, defense counter, or a custom user category. This provided category may be used in naming the text file in accordance with the naming convention specified by the rules. It is envisioned that the procedures described with respect to FIG. 11 may be performed on a batch level.

FIG. 12 illustrates a computer-implemented method 1200 for generating designations from an electronic transcript containing electronically marked up text in accordance with the present disclosure. Beginning at block 1202, one or more computer processors may access an electronic version of a deposition testimony transcript containing electronically marked up text. For example, it is envisioned that an attorney may electronically highlight text in the electronic version of the transcript and save the electronically highlighted document to a non-transitory computer-readable medium. Block 1202 may, thus, involve the one or more computer processors accessing the stored electronic version of the transcript in the non-transitory computer-readable medium. Alternatively, block 1202 may involve access a stored processed and marked up textual transcript created by method 1000 (see FIG. 10). Processing may proceed from block 1202 to block 1204.

At block 1204, the one or more computer processors may receive, via a user interface, a user selection of a type of mark up, such as highlighted text, underlined text, or otherwise marked up text. For example, it is envisioned that the user may be able to specify a hue of highlight or color of underline to aid in detection of highlighted text. Processing may proceed from block 1204 to block 1206.

At block 1206, the one or more computer processors may perform determinations regarding which text of the textual transcript is marked up, and these determinations may be performed according to the type of markup selected by the user. For example, if the user selected highlighted text, then other types of markup may be ignored. Additionally, if the user specified a color of highlight, then the highlighted text may be identified by detecting the color of the highlight applied to the text. Processing may proceed from block 1206 to block 1208.

At block 1208, the one or more computer processors access rules for designation generation. For example, the rules may specify a format for listing the designations, and this format may be uniform. Processing may proceed from block 1208 to block 1210.

At block 1210, the one or more computer processors may generate designations based on the determinations and the rules. For example, a text file may be created that lists the designations and this text file may be given a name according to a naming convention specified in the rules accessed at block 1208. It is also envisioned that a user input, received via the user interface, may provide a category for the designations, such as plaintiff affirmative, defense counter, defense affirmative, defense counter, or a custom user category. This provided category may be used in naming the text file in accordance with the naming convention specified by the rules. It is envisioned that the procedures described with respect to FIG. 12 may be performed on a batch level.

FIG. 13 illustrates a computer-implemented method for generating designations from recordings of spoken designations in accordance with the present disclosure. Beginning at block 1302, one or more computer processors may access recordings of spoken designations. For example, it is envisioned that an attorney may dictate designations into a recorder and store a sound file in a non-transitory computer-readable medium. Thus, block 1302 may involve accessing the stored sound file. Processing may proceed from block 1302 to block 1304.

At block 1304, the one or more computer processors may perform speech to text with respect to the spoken designations. Processing may proceed from block 1304 to block 1306.

At block 1306, the one or more computer processors may access rules for generating designations based on generated text. For example, the rules may specify a format for listing the designations, and this format may be uniform. Processing may proceed from block 1306 to block 1308.

At block 1308, the one or more computer processors may generate designations based on the rules. For example, a text file may be created that lists the designations and this text file may be given a name according to a naming convention specified in the rules accessed at block 1306. It is also envisioned that a user input, received via the user interface, may provide a category for the designations, such as plaintiff affirmative, defense counter, defense affirmative, defense counter, or a custom user category. This provided category may be used in naming the text file in accordance with the naming convention specified by the rules. It is envisioned that the procedures described with respect to FIG. 13 may be performed on a batch level.

Figure 14:
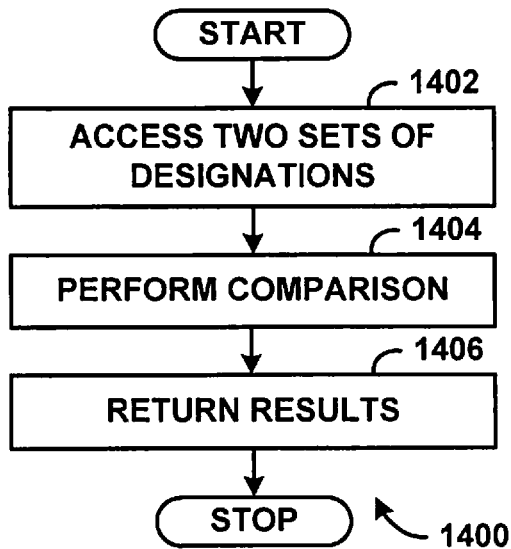
FIG. 14 illustrates a computer-implemented method for comparing two sets of designations in accordance with the present disclosure.

FIG. 14 illustrates a computer-implemented method 1400 for comparing two sets of designations in accordance with the present disclosure. Beginning at block 1402, one or more computer processors may access two sets of designations. For example, stored text files having the same name but different dates may be accessed, and these files may contain original and revised designations, respectively. Processing may proceed from block 1402 to block 1404.

At block 1404, the one or more computer processors may perform a comparison of the accessed text files. It is envisioned that a text file having an earlier date may be used as a base document for comparison. Processing may proceed from block 1404 to block 1406.

At block 1406, the one or more computer processors may return the results of the comparison, for example, as a new text file containing results of the comparison. If a video clip load file is present, it may return different results, based on the current clips. Alternatively or additionally, data representing the similarities and/or differences detected by the comparison may be input to another process, as will be described further below with respect to FIG. 16. It is envisioned that the procedures described with respect to FIG. 14 may be performed on a batch level.

Figure 15:
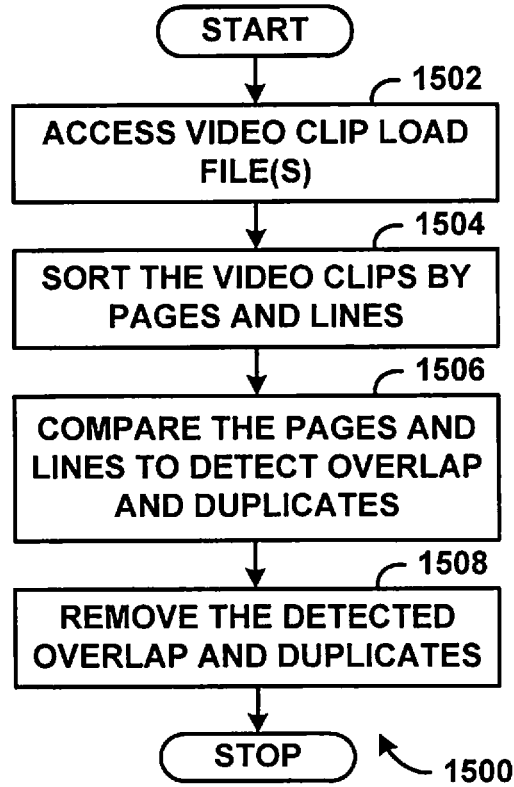
FIG. 15 illustrates a computer-implemented method for processing video clip load files in accordance with the present disclosure.

FIG. 15 illustrates a computer-implemented method 1500 for processing video clip load files in accordance with the present disclosure. Beginning at block 1502, one or more computer processors may access a video clip load file having page and line numbers. For example, a video clip load file or files stored in a non-transitory computer-readable medium may be accessed. Processing may proceed from block 1502 to block 1504.

At block 1504, the one or more computer processors may extract and sort the designations of the accessed video clip load file in order by the page and line numbers. Processing may proceed from block 1504 to block 1506.

At block 1506, the one or more computer processors may compare the pages and lines of the video clips to detect overlap between the video clips and/or duplicate video clips. This process may be identical to that described above with respect to FIG. 5. Processing may proceed from block 1506 to block 1508.

At block 1508, the one or more computer processors may remove detected overlap and/or duplicates. This process may also be similar to that described above with respect to FIG. 5, and may employ similar logic applied to video clips instead of designations. It is envisioned that the procedures described with respect to FIG. 15 may be performed on a batch level.

Figure 16:
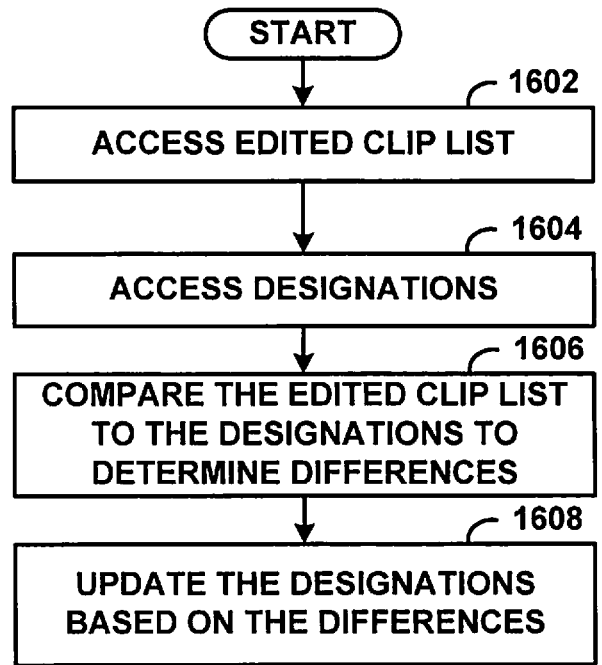
FIG. 16 illustrates a computer-implemented method for updating designations based on an edited video clip list in accordance with the present disclosure.

FIG. 16 illustrates a computer-implemented method 1600 for updating designations based on an edited video clip list in accordance with the present disclosure. Beginning at block 1602, one or more computer processors may access an edited video clip list. For example, it is envisioned that an edited video clip list may be exported from a video editing program that uses designations to edit video. This video clip list may be stored in a non-transitory computer-readable medium, and block 1602 may include accessing the stored video clip list. Processing may proceed from block 1602 to block 1604.

At block 1604, the one or more computer processors may access the designations for the video testimony transcript. It is envisioned that the designations may be accessed as one or more stored text files or stored CSV file containing sets of designations that were employed by the video editing program to edit video and thereby generate a video that was edited to produce the accessed edited video clip list. Processing may proceed from block 1604 to block 1606.

At block 1606, the one or more computer processors may compare the edited clip list to the designations to determine differences. This process may include accessing rules for converting the edited clip list to a designation format for comparison to the designations and converting the edited clip list to the designation format according to the rules. Comparing the accessed designations to the designations generated by the conversion of the edited clip list may then be performed, for example, as described above with reference to FIG. 14. Processing may proceed from block 1606 to block 1608.

At block 1608, the one or more computer processors may update the designations based on the determined differences. For example, data regarding the differences may be processed to add, remove, and/or combine designations. As described above with respect to FIG. 5, user selections may govern whether the one or more computer processors remove overlap or combine adjacent designations. It is envisioned that the procedures described with respect to FIG. 16 may be performed on a batch level.

It is appreciated that the above example cases may be implemented separately or in combination. Additionally, it is noted that one or more steps in the example flow processes of FIGS. 5 and 10-16 may be implemented in a differing order or omitted all together. For example, in FIG. 5 the removing overlap and combining adjacent designation steps may be omitted, switched in order, or implemented before or after quarantining errors. Additionally, in FIG. 10 the transcript marking step may be implemented before removing non-designated text. Accordingly, one of skill in the art would understand that these and other steps may be implemented in various orders in some embodiments.

It is noted that the functional blocks, modules and processes illustrated in FIGS. 5 and 10-16 may comprise or utilize processors, electronics devices, hardware devices, electronics components, logical circuits, memories, software codes, firmware codes, etc., or any combination thereof. Further, it is noted that the functionality described may be implemented entirely in a standalone program or could be implemented as a functional plugin to an existing program. For example, existing trial designation programs may be provided with a plugin functionality which accesses designations and implements the described error checking, quarantining, etc.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for processing designation information associated with deposition testimony, the method comprising:
    receiving, by one or more computer processors, information that includes a first set of designations that identify one or more first portions of content corresponding to a deposition testimony;
    analyzing, by the one or more computer processors, the first set of designations to identify designations that contain errors;
    quarantining, by the one or more computer processors, the designations identified as containing errors;

receiving, by the one or more computer processors, configuration information that includes one or more parameters configured to control processing of designations within the first set of designations to generate a processed designation file, wherein the one or more parameters comprises at least a combine adjacent designations by page number parameter, a combine adjacent designations by line number parameter, and a remove overlapping designations parameter, wherein the combine adjacent designations by page number parameter is configured to combine adjacent designations based on whether a previous designation of the first set of designations ends on a last line of a particular page of the deposition testimony and a current designation of the first set of designations begins on a first line of another page of the deposition testimony that immediately follows the particular page, wherein the combine adjacent designations by line number parameter is configured to combine adjacent designations based on whether the previous designation ends on a particular line number of a page of the deposition testimony and the current designation of the first set of designations begins on a next line number of the page of the deposition testimony that immediately follows the particular line number, wherein the remove overlapping designations parameter is configured to remove an overlapping portion of a first particular designation and a second particular designation, and wherein the overlapping portion is removed by removing the second particular designation when the second particular designation begins after the first designation and ends before an end of the first particular designation or replacing an end of the first particular designation with an end of the second particular designation when the second particular designation begins before the end of the first particular designation ends after the end of the first particular designation; and generating, by the one or more computer processors, the processed designation file based on the configuration information and the quarantining, wherein the processed designation file includes a particular set of designations corresponding to at least the one or more first portions of the content corresponding to the deposition testimony, and wherein the adjacent designations within the first set of designations are combined in the particular set of designations and the overlapping portion is removed in the particular set of designations in accordance with the one or more parameters included in the configuration information, and wherein designations identified as containing errors are omitted from the processed designations file.

2. The method of claim 1, further comprising:
retrieving, by the one or more computer processors, a textual transcript of the deposition testimony;
presenting, by the one or more computer processors, the textual transcript to a user;
receiving, by the one or more computer processors, a first set inputs corresponding to a first set markups of the textual transcript; and
generating the first set of designations based on the first set markups of the textual transcript, wherein the one or more first portions of content corresponding to the deposition testimony correspond to portions of the textual transcript marked up by the first set markups.

3. The method of claim 2, further comprising receiving, by the one or more computer processors, one or more additional sets of inputs corresponding to one or more additional sets of markups of the textual transcript, the one or more additional sets of markups corresponding to one or more additional sets of designations that identify particular portions of the content corresponding to the deposition testimony.

4. The method of claim 3, wherein the first set markups and each additional set of markups of the one or more additional sets of markups are associated with a designation type.

5. The method of claim 4, wherein the designation types include at least a plaintiff affirmative designation type, a plaintiff counter designation type, a defendant affirmative designation type, and a defendant counter designation type, and wherein the configuration information comprises a combine by designation type parameter configured to control whether designations of a first designation type are to be combined with designations of a second designation type in accordance with the combine adjacent designations by page number parameter and the combine adjacent designations by line number parameter.

6. The method of claim 1, wherein processing the first set of designations in accordance with the configuration information to generate the processed designation file further comprises:
comparing, by one or more computer processors, the first set of designations to a second set designations to determine whether the first set of designations and the second set designations are different, wherein the second set designations identify one or more second portions of the content corresponding to the deposition testimony; and
in response to a determination, based on the comparing, that the first set of designations and the second set designations are different, generating, by the one or more computer processors, difference information that identifies one or more differences between the first set of designations and the second set designations, wherein the processed designation file is generated based at least in part on the difference information.

7. The method of claim 1, wherein processing the first set of designations in accordance with the configuration information to generate the processed designation file further comprises:
comparing, by one or more computer processors, the first set of designations to a second set designations to identify similarities between the first set of designations and the second set designations, wherein the second set designations identify one or more second portions of the content corresponding to the deposition testimony; and
generating, by the one or more computer processors, based on the comparing, similarity information that identifies one or more similarities between the first set of designations and the second set designations, wherein the processed designation file is generated based at least in part on the similarity information.

8. The method of claim 1, further comprising:
receiving, by the one or more computer processors, one or more media files corresponding to the deposition testimony; and
synchronizing, by the one or more computer processors, portions of media content included in the one or more media files with the first set of designations.

9. The method of claim 1, further comprising:
accessing, by one or more computer processors, an edited video clip list;

comparing, by the one or more computer processors, the edited video clip list to the first set of designations to determine differences and/or similarities between the first set of designations and the edited video clip list; and generating, by the one or more computer processors, based on the comparing, the processed designation file based on the differences and/or similarities between the first set of designations and the edited video clip list.

10. A non-transitory computer-readable medium storing instructions that, when executed by one or more processors, cause the one or more processors to perform operations for processing designation information associated with deposition testimony, the operations comprising:

receiving information that includes a first set of designations that identify one or more first portions of content corresponding to a deposition testimony;

analyzing the first set of designations to identify designations that contain errors;

quarantining, by the one or more computer processors, the designations identified as containing errors;

receiving configuration information that includes one or more parameters configured to control processing of designations within the first set of designations to generate a processed designation file, wherein the one or more parameters comprises at least a combine adjacent designations by page number parameter, a combine adjacent designations by line number parameter, and a combine overlapping designations parameter, wherein the combine adjacent designations by page number parameter is configured to combine adjacent designations based on whether a previous designation of the first set of designations ends on a last line of a particular page of the deposition testimony and a current designation of the first set of designations begins on a first line of another page of the deposition testimony that immediately follows the particular page, wherein the combine adjacent designations by line number parameter is configured to combine adjacent designations based on whether the previous designation ends on a particular line number of a page of the deposition testimony and the current designation of the first set of designations begins on a next line number of the page of the deposition testimony that immediately follows the particular line number, wherein the combine overlapping designations parameter is configured to remove an overlapping portion of a first particular designation and a second particular designation, and wherein the overlapping portion is removed by removing the second particular designation when the second particular designation begins after the first designation and ends before an end of the first particular designation or replacing an end of the first particular designation with an end of the second particular designation when the second particular designation begins before the end of the first particular designation ends after the end of the first particular designation; and generating the processed designation file based on the configuration information and the quarantining, wherein the processed file includes a particular set of designations corresponding to at least the one or more first portions of the content corresponding to the deposition testimony, and wherein the adjacent designations within the first set of designations are combined in the particular set of designations and the overlapping portion is removed in the particular set of designations in accordance with the one or more parameters included in the configuration information, and wherein designations identified as containing errors are omitted from the processed designations file.

11. The non-transitory computer-readable medium of claim 10, wherein the first set of designations comprises designations associated with one or more designation types, wherein the one or more designation types include at least a plaintiff affirmative designation type, a plaintiff counter designation type, a defendant affirmative designation type, and a defendant counter designation type, and wherein the configuration information comprises a combine by designation type parameter configured to control whether designations of a first designation type are to be combined with designations of a second designation type.

12. The non-transitory computer-readable medium of claim 10, the operations further comprising:

retrieving a textual transcript of the deposition testimony;

presenting the textual transcript to a user;

receiving a first set inputs corresponding to a first set markups of the textual transcript; and generating the first set of designations based on the first set markups of the textual transcript, wherein the one or more first portions of content corresponding to the deposition testimony correspond to portions of the textual transcript marked up by the first set markups.

13. The non-transitory computer-readable medium of claim 12, wherein the operations further comprise receiving one or more additional sets of inputs corresponding to one or more additional sets of markups of the textual transcript, wherein the first set markups and each additional set of markups of the one or more additional sets of markups are associated with one or more designation types, wherein the one or more designation types includes at least a plaintiff affirmative designation type, a plaintiff counter designation type, a defendant affirmative designation type, and a defendant counter designation type.

14. An apparatus for processing designation information associated with deposition testimony, the apparatus comprising:

a memory; and at least one processor coupled to the memory, the at least one processor configured to:

receive information that includes a first set of designations that identify one or more first portions of content corresponding to a deposition testimony;

analyze the first set of designations to identify designations that contain errors;

quarantine the designations identified as containing errors;

receive configuration information that includes one or more parameters configured to control processing of designations within the first set of designations to generate a processed designation file, wherein the one or more parameters comprises at least a combine adjacent designations by page number parameter, a combine adjacent designations by line number parameter, and a combine overlapping designations parameter, wherein the combine adjacent designations by page number parameter is configured to combine adjacent designations based on whether a previous designation of the first set of designations ends on a last line of a particular page of the deposition testimony and a current designation of the first set of designations begins on a first line of another page of the deposition testimony that immediately follows the particular page, wherein the combine adjacent designations by line number parameter is configured to combine adjacent designations based on whether the previous designation ends on a particular line number of a page of the deposition testimony and the current designation of the first set of designations begins on a next line number of the page of the deposition testimony that immediately follows the particular line number, wherein the combine overlapping designations parameter is configured to remove an overlapping portion of a first particular designation and a second particular designation, and wherein the overlapping portion is removed by removing the second particular designation when the second particular designation begins after the first designation and ends before an end of the first particular designation or replacing an end of the first particular designation with an end of the second particular designation when the second particular designation begins before the end of the first particular designation ends after the end of the first particular designation; and generate the processed designation file based on the configuration information and the quarantining, wherein the processed designation file includes a particular set of designations corresponding to at least the one or more first portions of the content corresponding to the deposition testimony, and wherein the adjacent designations within the first set of designations are combined in the particular set of designations and the overlapping portion is removed in the particular set of designations in accordance with the one or more parameters included in the configuration information, and wherein designations identified as containing errors are omitted from the processed designations file.

15. The apparatus of claim 14, wherein the at least one processor is further configured to receive one or more additional sets of designations, wherein the first set of designations comprises one or more designations specified using line numbers and page numbers and at least one of the one or more additional sets of designations comprises one or more designations specified using timestamps corresponding to a video recording of the deposition testimony, wherein the first set of designations and each additional set of designations of the one or more additional sets of designations comprises designations associated with one or more designation types, wherein the one or more designation types include at least a plaintiff affirmative designation type, a plaintiff counter designation type, a defendant affirmative designation type, and a defendant counter designation type.

16. The apparatus of claim 14, wherein the configuration information further indicates the adjacent designations are to be combined in accordance with the combine adjacent designations by page number parameter and the combine adjacent designations by line number parameter based on a designation type such that a first designation associated with a first designation type is not combined with a second designation associated with a second designation type irrespective of whether the first designation is an adjacent designation with respect to the second designation.

* * * * *